United States Patent [19]
Van Romer

[11] Patent Number: 5,762,233
[45] Date of Patent: Jun. 9, 1998

[54] FOLDABLE SPILL COLLECTOR CONTAINER

[76] Inventor: Edward W. Van Romer, 1018 Arrowhead Point, Anderson, S.C. 29625

[21] Appl. No.: 852,840

[22] Filed: May 7, 1997

[51] Int. Cl.$^6$ .................................................. B65D 1/37
[52] U.S. Cl. ................................. 220/573; 220/9.1
[58] Field of Search .......................... 220/571, 573, 220/9.1, 9.2, 9.3

[56] References Cited

U.S. PATENT DOCUMENTS

| | | | |
|---|---|---|---|
| 92,364 | 7/1869 | Rider . | |
| 935,278 | 9/1909 | Smyth . | |
| 5,090,588 | 2/1992 | Van Romer et al. | 220/573 |
| 5,316,175 | 5/1994 | Van Romer | 220/573 |
| 5,330,579 | 7/1994 | Rushing et al. | 220/573 |
| 5,478,625 | 12/1995 | Wright | 428/119 |
| 5,511,683 | 4/1996 | Dailey | 220/573 |
| 5,516,318 | 5/1996 | Saylor | 441/40 |
| 5,547,312 | 8/1996 | Schmitz, Jr. | 405/52 |

*Primary Examiner*—Joseph M. Moy
*Attorney, Agent, or Firm*—Cort Flint

[57] ABSTRACT

A foldable, portable containment is disclosed having ground sheeting which provides a floor section with a peripheral retaining wall made integral with the ground sheeting to contain hazardous spillage from a vehicle moved upon the floor section of the containment. Improved side bracing of the retaining wall is provided by rigid side braces having a rigid vertical leg, an inclined rigid leg which is affixed to a horizontal leg at a hinge. The free end of the horizontal leg abuts the vertical leg so that the inclined leg is anchored a fixed distance away from the retaining wall at an optimum bracing angle for reinforcement. The side braces may be made reversible so that they may be disposed on either an interior side of the retaining wall or an exterior side of the retaining wall to provide a trip profile. In either case, an anchor tab is provided to anchor the inclined leg at the hinge for optimum bracing effect.

27 Claims, 5 Drawing Sheets

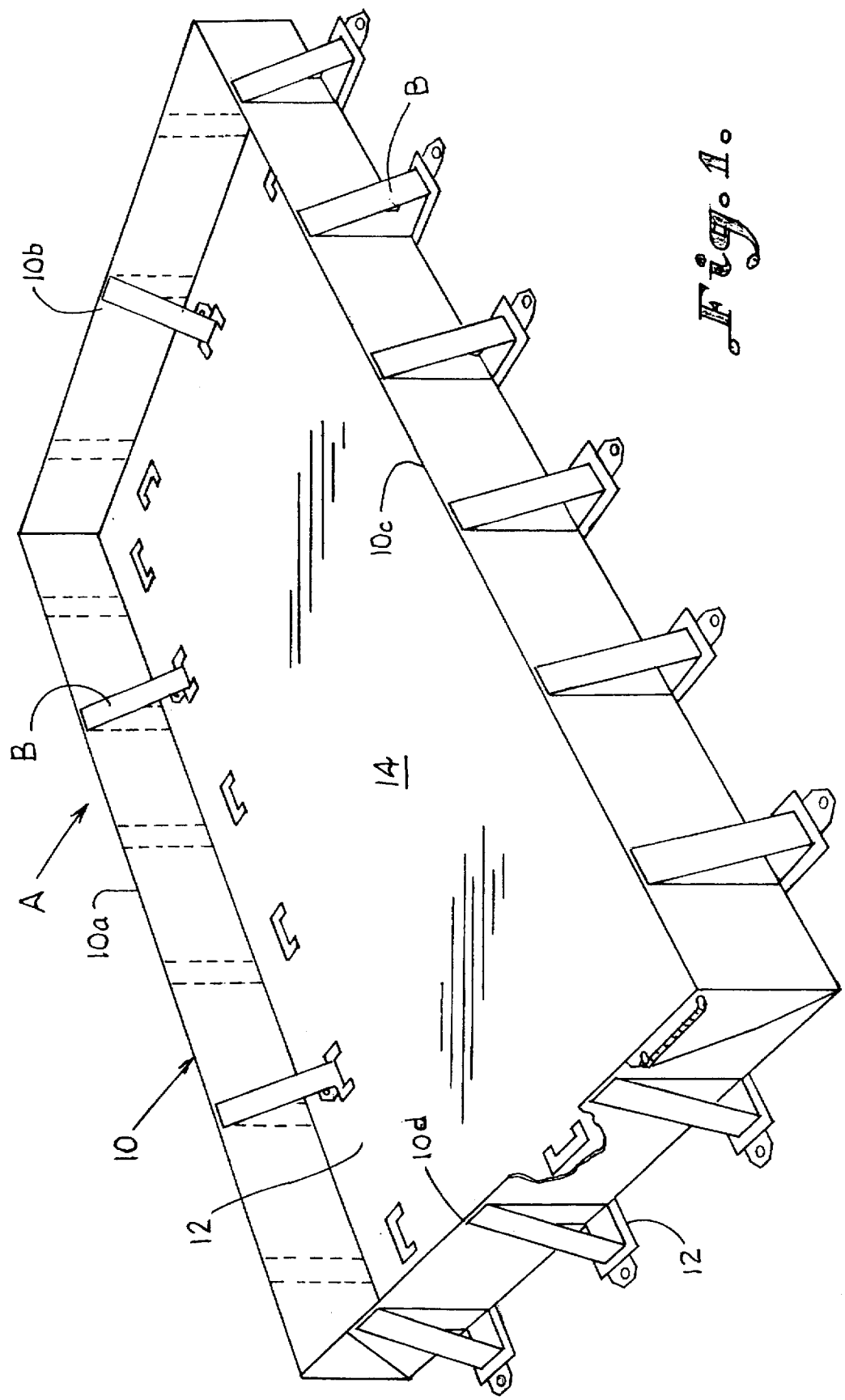

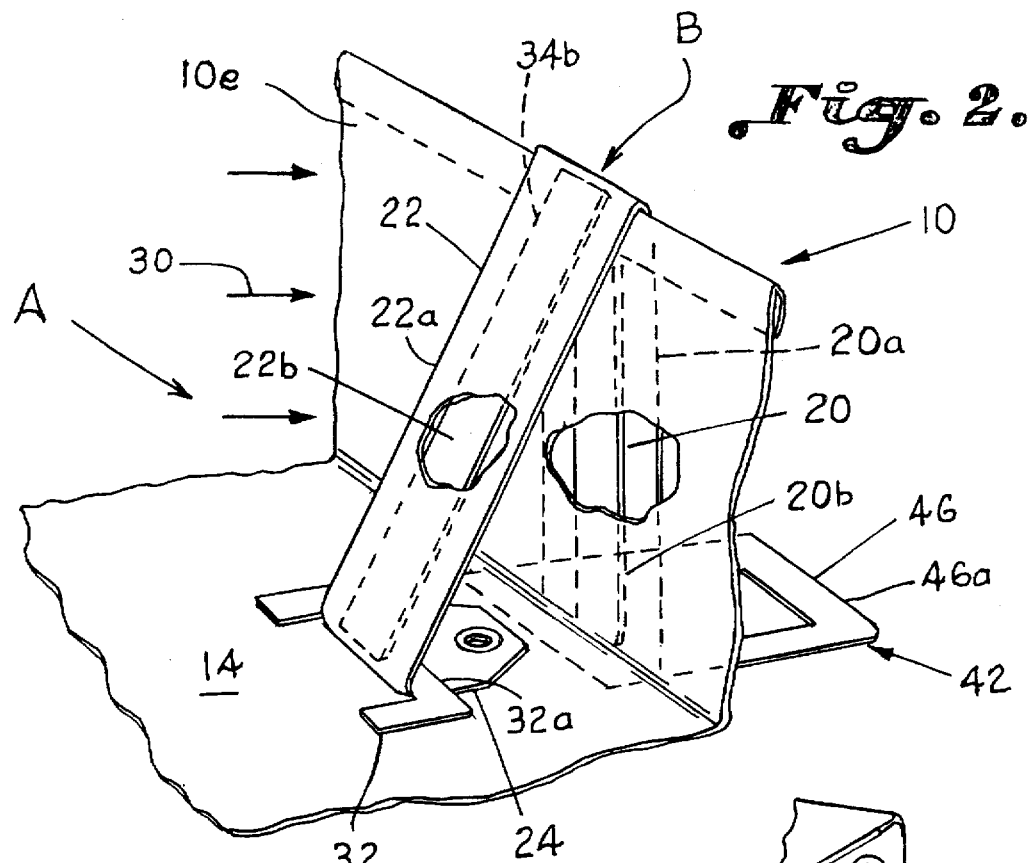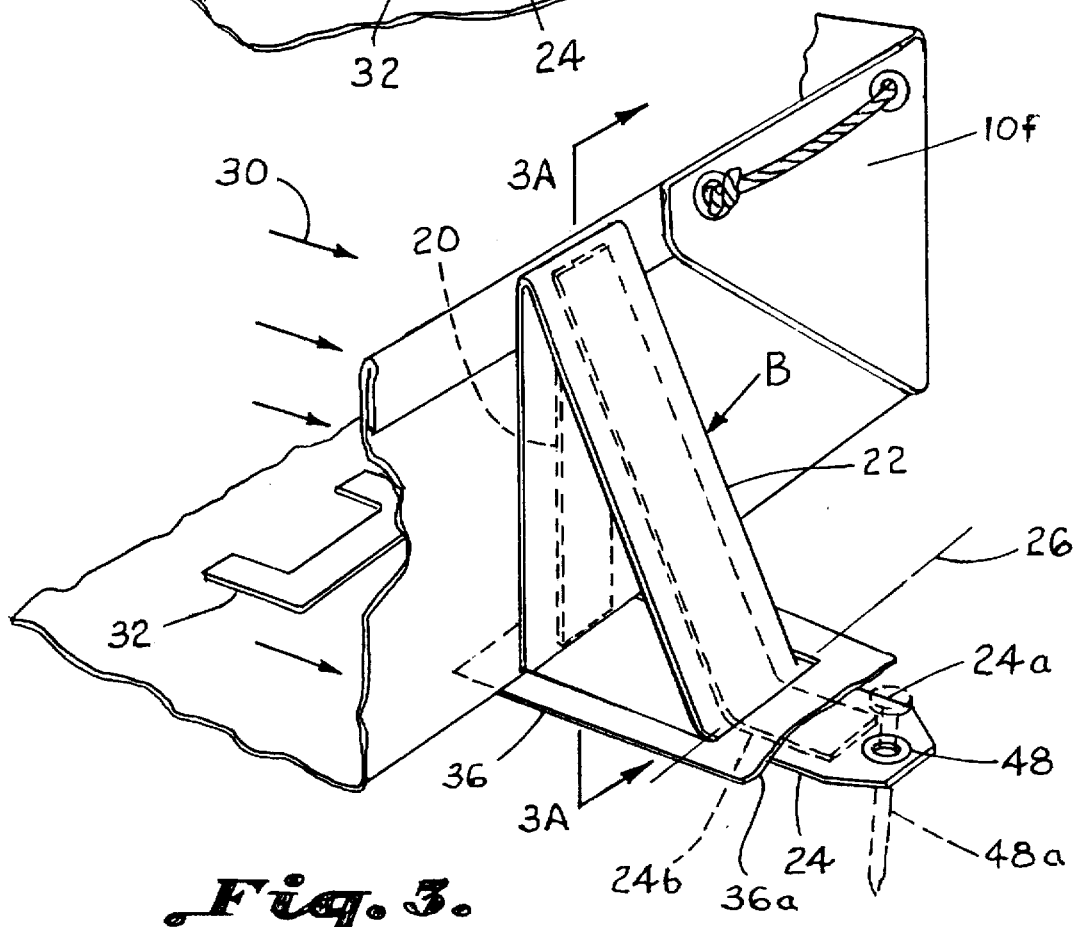

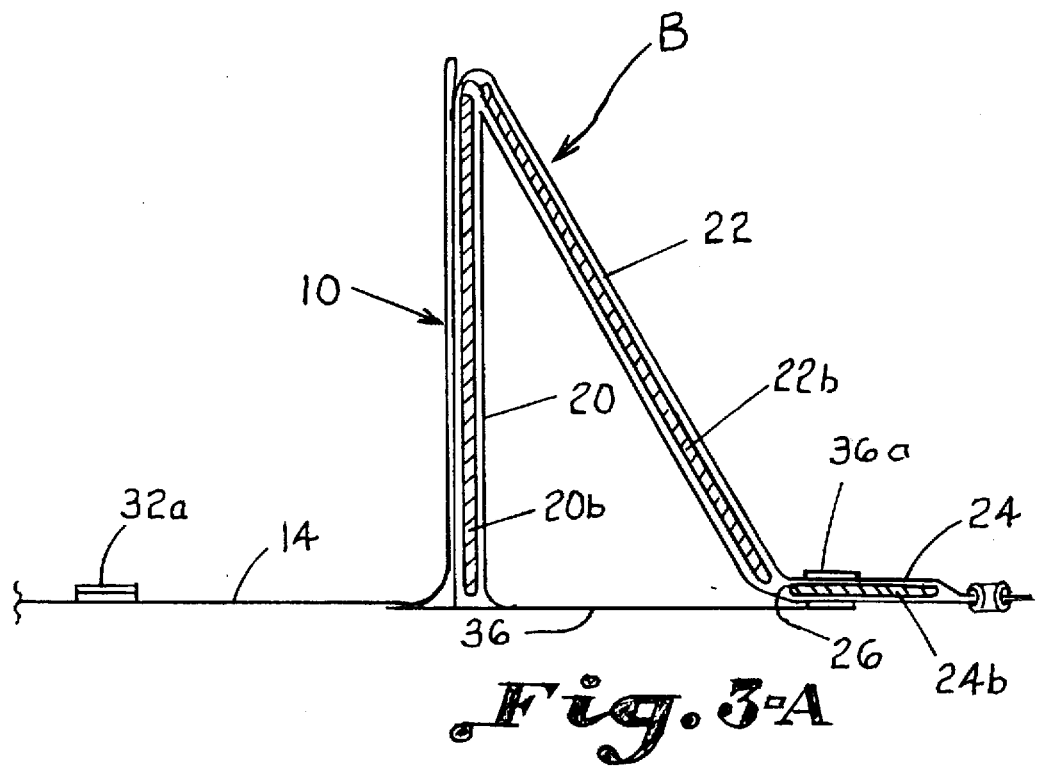
Fig. 3-A
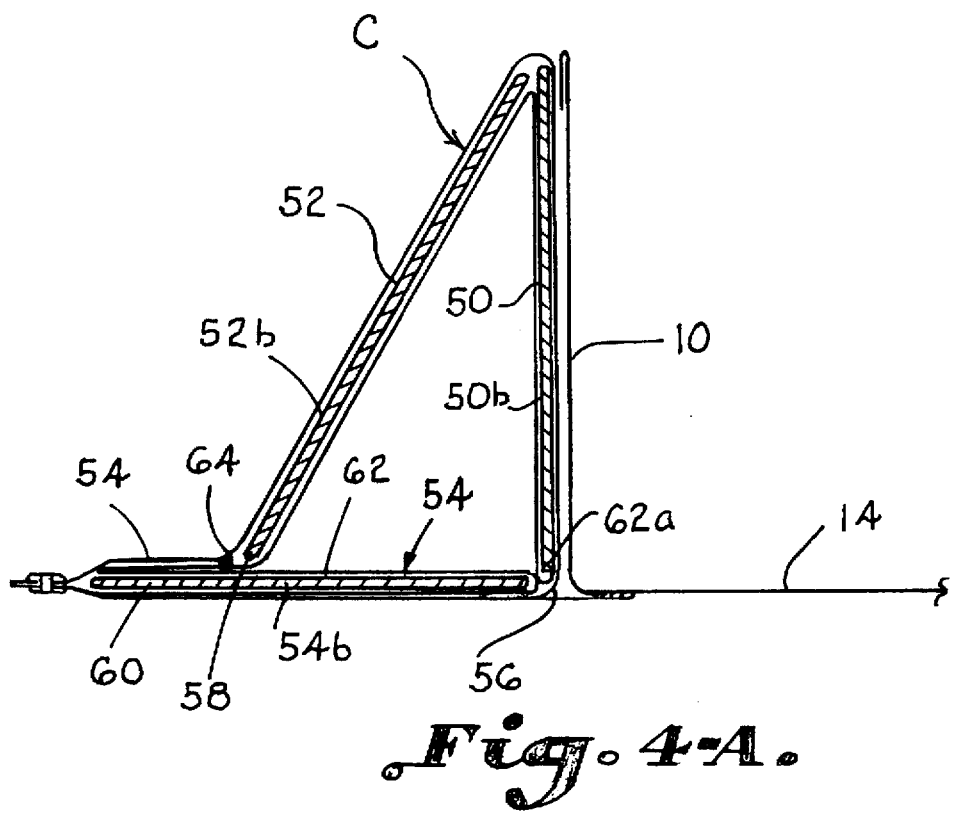
Fig. 4-A.

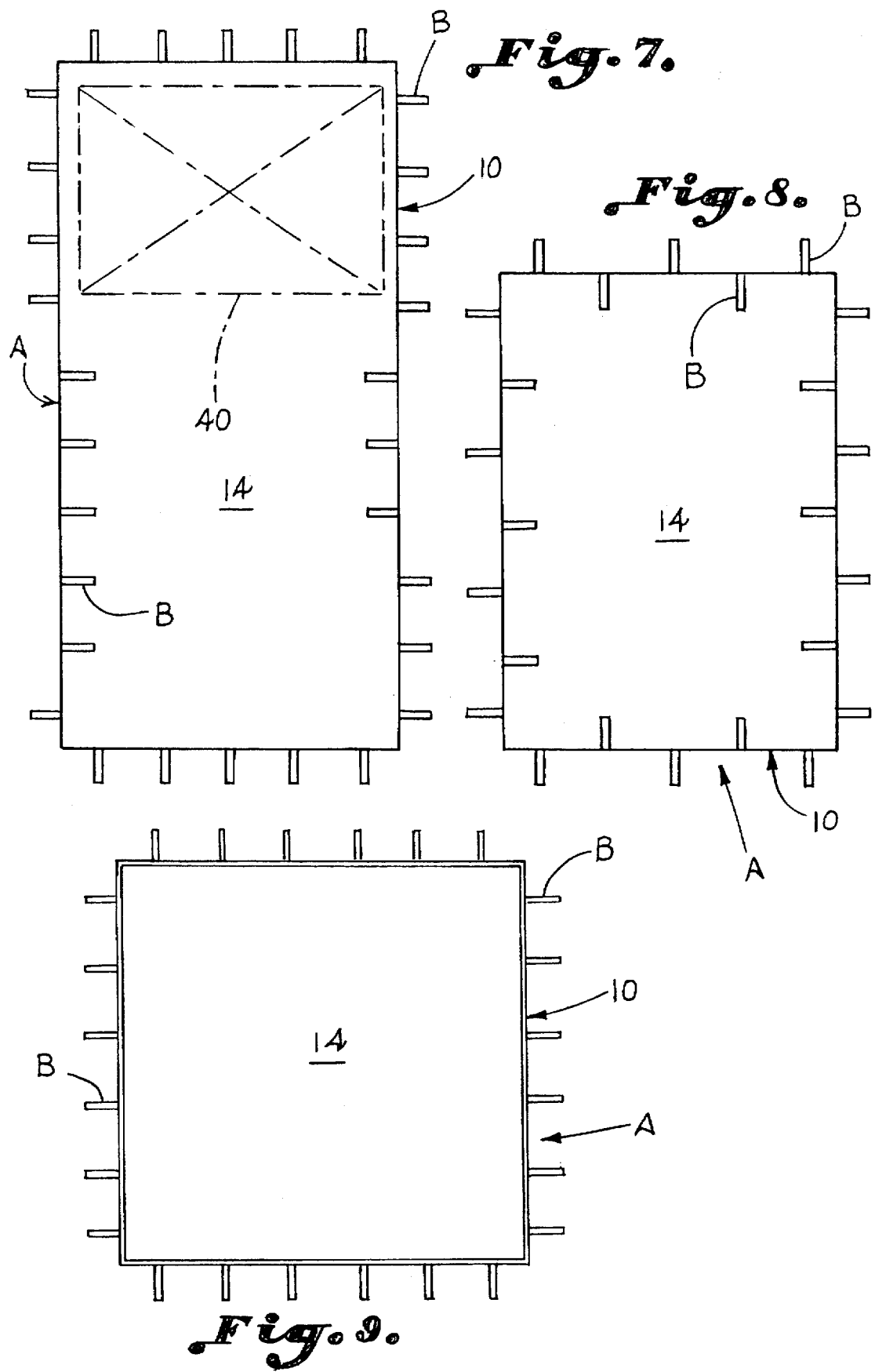

FOLDABLE SPILL COLLECTOR CONTAINER

BACKGROUND OF THE INVENTION

This invention relates to a portable, foldable containment device for hazardous chemicals, such as petrochemicals and the like, and the prevention of environmental contamination by such chemicals. Environmental ground contamination is often the long term result of point source spills in the transfer of petrochemicals from one container to the other. The problem of loading and off-loading petrochemicals and fuels in a manner that prevents environmental ground and water contamination is a problem which considerable attention need be given.

Prior art foldable, portable containments have been provided which can be driven upon by a vehicle, aircraft, and the like for loading of petrochemicals, washing of the vehicle, etc. For example, U.S. Pat. No. 5,090,588 discloses a portable containment for petrochemicals that is comprised of resilient sidewall braces. These braces allow the sidewall to deform so that a vehicle may be driven over the collapsible wall. While providing good ingress and egress of the containment, the resilient nature of the collapsible wall limits the spill retention capacity by restricting the maximum height of the containment walls. The containment requires interior bracing straps which are designed to allow the resiliently braced wall to collapse when driven over, but would not support a much higher wall needed for containing voluminous spills. U.S. Pat. No. 5,316,175 discloses a portable, foldable spill collector containment which utilizes rigid braces in the side walls to provide support for a higher sidewall and a greater volume of containment. Again, the bracing arrangement requires interior braces which merely hold the walls against the outward deformation when containing fluid spillage. While the interior braces are suitable for many applications, the interior placement of the braces causes problems in other applications, for example, where space is limited and the vehicle fills much of the containment area, the braces are often tripped and damaged by the vehicle. Use of the interior braces also requires an additional four foot width of material in the dimensions of the containment in order to provide a given free floor space. Also the type of strap bracing utilized in the prior containment devices restricts the flatness of the containment in a folded configuration. Other portable containment devices for containing runoff from washing vehicles and the like is shown in U.S. Pat. Nos. 5,547,312 and 5,511,683.

Accordingly, an important object of the invention is to provide a foldable, portable containment for containing hazardous spills with improved retaining wall bracing.

Another important object of the present invention is to provide a foldable, portable containment which provides the maximum amount of usable containment floor area for the minimum total footprint area resulting in a savings of space and material.

Another object of the present invention is to provide a foldable, portable containment for containing hazardous spills in which retaining wall braces are provided that can be quickly changed from a folded to a bracing position.

Another important object of the present invention is to provide a foldable, portable containment for hazardous spills having improved bracing straps for the upstanding retaining wall which can be reversed from the inside to the outside of the retaining wall to control the trip profile of the braces and adapt to various equipment being placed on the containment floor.

Another object of the present invention is to provide a portable, foldable spill containment having improved retaining wall bracing to add stabilization against wind effects and the like for increased wall heights.

SUMMARY OF THE INVENTION

The above objectives are accomplished according to the present invention by providing a portable containment for containing spilled material and preventing environmental ground contamination. The containment, which may be easily folded for transportation and storage, includes a foldable ground sheeting which, when unfolded, covers the ground and provides a floor section for containing spilled material. The containment also includes a foldable, generally upstanding retaining wall which is integrally connected to the floor section. The retaining wall, in cooperation with the unfolded floor section, helps to contain the spilled material. A plurality of foldable side braces are connected to the wall and the ground sheeting and provide a bracing position for maintaining the wall in the upstanding configuration. The side braces, in the bracing configuration, include a generally vertical rigid leg carried by the retaining wall, a generally horizontal leg parallel to the ground sheeting, and an inclined rigid leg extending between an upper portion of the retaining wall and the horizontal leg to brace the retaining wall in the upstanding configuration. A hinge defined at an intersection of the inclined leg and the horizontal leg allows the inclined leg and the horizontal leg to pivot relative to each other. A brace fixture secures the hinge at a fixed distance from the retaining wall when the side brace is in the bracing position and the retaining wall is in the upstanding position in order to retain the spilled material.

The inclined leg may be disposed on an exterior side of the retaining wall to require less material and space. Also, the brace fixture may include a first anchor affixed to an interior side of the retaining wall, and a second anchor carried near the exterior side of the retaining wall to secure the horizontal leg in position when the inclined leg is selectively positioned inside or outside the wall. The anchor includes an anchor tab of ground sheeting, and said horizontal leg is secured underneath this anchor tab. A grommet located in the horizontal leg provides for fastening the horizontal leg to the ground. The horizontal leg includes a rigid arm that extends from the hinge generally to the vertical leg. The rigid arm has a free end which abuts with the vertical leg at the retaining wall. A connector strap connects the horizontal leg at the hinge to the floor ground sheeting at the wall to secure the position of the hinge at a fixed distance from the retaining wall. The rigid arm includes a rear arm element which extends rearwardly from the hinge so that the horizontal leg can be grasped and pivoted about the hinge. This pivoting motion moves the rigid arm away from the vertical leg to allow for folding of the containment.

The inclined leg includes a rigid arm extending generally from the upper portion of the retaining wall to the terminal end near the hinge to brace the retaining wall in the upstanding configuration. A strap of sheeting material encases the rigid arms of the inclined and horizontal legs to form the hinge where the inclined and horizontal legs intersect. The rigid arm of the horizontal leg includes a rear arm element encased within the strap which extends rearwardly from the hinge.

DESCRIPTION OF THE DRAWING

The construction designed to carry out the invention will hereinafter be described, together with other features thereof.

FIG. 1 is a perspective view illustrating an embodiment of a foldable, portable containment device having improved reversible side bracing for the retaining wall constructed according to the invention;

FIG. 2 is a perspective view of the side bracing disposed on the interior side of the retaining wall;

FIG. 3 is a perspective view illustrating the side bracing disposed on an exterior side of the retaining wall according to the invention;

FIG. 3a is a sectional view taken along line 3a—3a of FIG. 3;

FIG. 4a is a sectional view taken along line 4a—4a of FIG. 4;

FIG. 7 is a top plan view illustrating an arrangement of side bracing disposed to the interior and exterior of a portable containment retaining wall according to the invention;

FIG. 8 is a top plan view of an alternate arrangement wherein the reversible side braces are alternated to the interior and exterior in a balanced pattern; and FIG. 9 is a top plan view illustrating strap bracing according to invention of FIG. 4.

DESCRIPTION OF A PREFERRED EMBODIMENT

Figure 4:
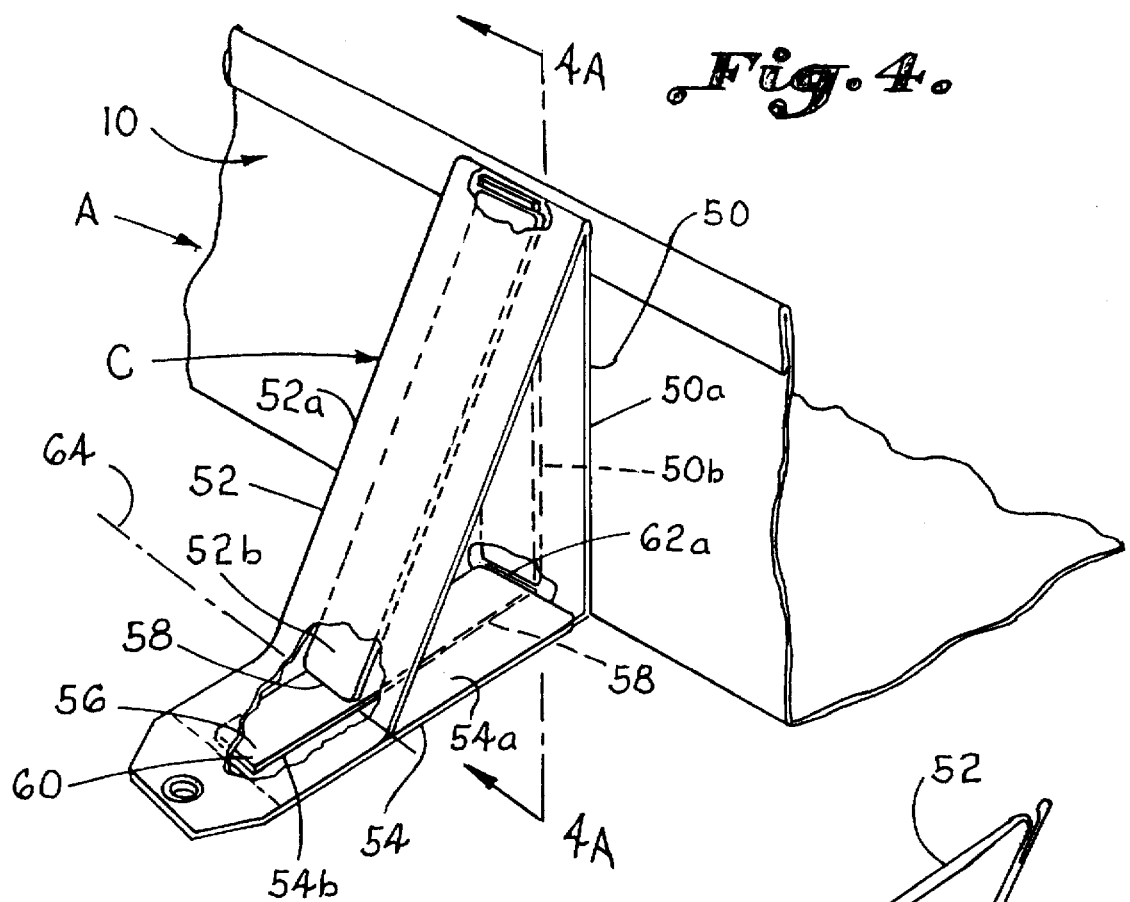
FIG. 4 is another embodiment of the present invention having quickly releasable side bracing for bracing a retaining wall in an upstanding configuration according to the invention.

Referring now in more detail to the drawings, as can best be seen in FIG. 1, a portable containment device designated generally as A showing a foldable retaining wall, designated generally as 10, is illustrated for containing spilled materials such as petrochemicals and the like to prevent environmental ground contamination and ground water contamination. As illustrated, portable containment A includes ground sheeting 12 having a floor section 14. Foldable wall 10 extends about a periphery of the containment, and the illustrated embodiment is rectangular. The foldable wall is composed of sheet material integrally connected to the ground sheeting for containing spilled material in cooperation with floor section 14. Preferably, the sheeting of the wall and floor sections is comprised of a modified vinyl or polyurethane coated woven synthetic fabric. A suitable fabric is available from the Seaman Corporation of Wooster, Ohio, Product No. XR-5 or from Cooley, Inc. of Pawtucket, R.I. Model No. L3284NESU. The sheeting may be folded up at the sides to provide the wall, or the wall may be integrally attached to separate ground sheeting such as thermal or EMF or RF welding. Preferably, foldable wall 10 comprises a rectangular wall consisting of individual upstanding walls 10a, 10b, 10c, and 10d. It is to be understood, of course, that other wall configurations such as triangular, oval, or circular may also be used without parting from the features of the invention.

A plurality of side braces B are illustrated for bracing retaining wall 10 in an upstanding configuration, as can best be seen in FIG. 1. The side braces B may be mounted to the interior or the exterior of retaining wall 10. This allows placement of the side braces to provide a trip profile inside the container to accommodate the equipment being serviced. The trip profile means that side braces B are placed relative to the containment wall so that the equipment does not trip on the side braces when used. If the side braces are tripped, damage to the containment occurs, often resulting in spillage, particularly if the damage occurs unnoticed.

Referring in more detail to FIG. 2, an embodiment of the invention is illustrated wherein side braces B are provided which are reversible and may be braced on the interior or exterior side of the retaining wall 10. In FIG. 2, side brace B is disposed on an interior side 10e of the retaining wall and opposes the forces of fluid in the direction of arrows 30. In FIG. 3, brace B is disposed on an exterior side 10f of sidewall 10 and likewise braces against fluid forces in the direction of arrow 30. Side braces B include a vertical leg 20, an incline leg 22, and a horizontal leg 24. Vertical leg 20 includes a strap 20a composed of two pieces of sheeting which encase a rigid bar 20b. Incline leg 22 includes a strap 22a encasing a rigid bar 22b which terminates at horizontal leg 24. Rigid bar 22b terminates in a free end 28. Horizontal leg 24 includes a strap 24a formed from pieces of sheeting heat sealed together to encase a rigid arm 24b. A hinge 26 is formed by the sheeting at the intersection of rigid bar 22b and rigid arm 24b. Preferably, strap 20a, 22a, and 24a is a one-piece strapping heat welded as shown, and then affixed to the retaining wall. The rigid bars and arm may be any suitable material such as aluminum.

An anchor is carried by either the floor section of the ground sheeting or an external tab of the sheeting. This enables attachment of side braces B either on the interior side or exterior side of the retaining wall. In the illustrated embodiment, the anchor is provided by an interior anchor tab 32 having an arm 32a under which horizontal brace leg 24 is secured. Forces against the interior side of retaining wall 10 are resisted by this anchoring of horizontal leg 24. Anchor tab 32 may be heat sealed to floor section 14. Alternately, the anchor may be provided in the form of a portion of ground sheeting 34 heat sealed either to retaining wall 10 or floor section 14 (FIG. 3). In this case, anchor tab 36 includes an arm 36a under which horizontal leg 24 of brace B is secured in the exterior bracing position. A grommet 38 receives a fastener 38a for securing the brace to the ground. The corners of the containment may be made waterproof by double-folding the edges and securing the upper edges by a rope, as best can be seen in FIGS. 1 and 3.

Figure 5:
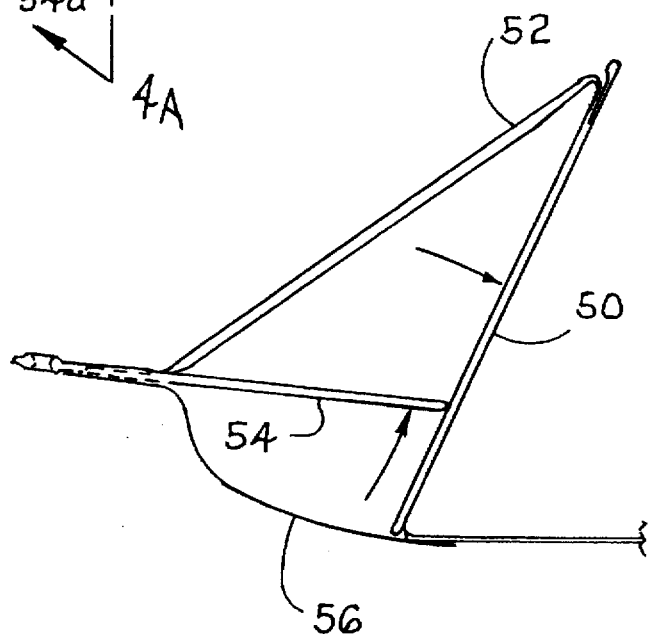
FIG. 5 is a side elevation illustrating the side bracing of FIG. 4 in an intermediate configuration wherein the side bracing is being folded.
Figure 6:
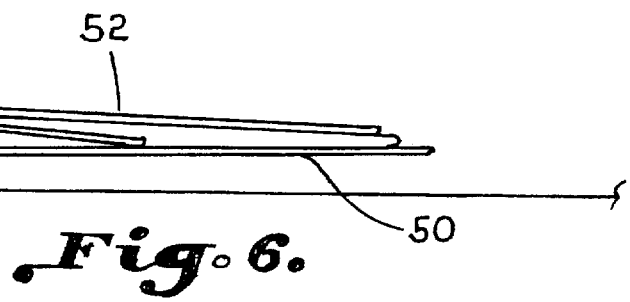
FIG. 6 is a side elevation illustrating the side bracing of FIG. 4 in a folded configuration.

As can best be seen in FIG. 4–6, another advantageous form of a side brace and containment is illustrated wherein side braces C include a generally vertical leg 50, an inclined leg 52, and a horizontal leg 54. There is a connector strap 56 extending beneath horizontal leg 54. Vertical leg 50 may be affixed to retaining wall 10 by means of heat welding or by other suitable means. Vertical leg 50 includes a strap 50a formed from two pieces of sheeting heat-welded together with a rigid bar 50b encased between the sheeting. Rigid bar 50b may be metal such as aluminum, plastic, or other suitable material. Inclined leg 52 extends from an upper portion of the wall and extends downward to horizontal leg 54. Inclined leg 52 includes a strap 52a formed from two pieces of sheeting which encase a rigid bar 52b terminating in a free, terminal end 58, terminating at horizontal leg 54. Horizontal leg 54 includes a strap 54a formed by two pieces of sheeting which encase a rigid arm 54b. Rigid arm 54b includes a rear arm element 60 extending rearwardly past free end 58 of inclined leg 52. Rigid arm 54b further includes a forward arm element 62 terminating in a free end 62a that abuts vertical leg 50 and retaining wall 10 whereby inclined brace leg 52 is maintained in a bracing position (FIG. 4) to maintain the wall upright. It will be noted that a hinge 64 is provided near an intersection of inclined bar 52b and horizontal arm 54b. Hinge 64 is defined by strap 52a and strap 54a being joined together by heat welding or other suitable means. As can best be seen in FIG. 2, as rear arm element 60 is manually grabbed, horizontal leg 54 may be pivoted counter-clockwise, away from connector strap 56, to release incline leg 52 from its bracing position shown in FIGS. 4.

Referring now to FIGS. 7–9, different floor plans and trip profiles for the reversible side braces can be seen in accordance with the invention. For example, in FIG. 7 reversible side braces B are shown in a selected pattern wherein at in one end of the containment, an area 70 is shown where all of the side braces B are disposed on the exterior side of retaining wall 10 to allow for the placement of a wide load. The remaining side braces can be arranged as desired. In FIG. 8, it can be seen that reversible braces B are alternated from the interior to the exterior side of the retaining wall to provide an even balancing of bracing forces by the side braces. Finally, FIG. 9 illustrates a floor plan for an embodiment of the invention employing quickly releasable side braces C of FIG. 4 when all the side braces are mounted on the exterior side of retaining wall 10. It can thus be seen that when external side braces B,C are used a considerable amount of floor space and material are saved.

While a preferred embodiment of the invention has been described using specific terms, such description is for illustrative purposes only, and it is to be understood that changes and variations may be made without departing from the spirit or scope of the following claims.

What is claimed is:

1. A portable containment for containing spilled material and preventing environmental ground contamination which may be easily folded for transportation and storage, comprising:
   (a) foldable ground sheeting overlying the ground in an unfolded configuration, said ground sheeting having a floor section for containing said spilled material in said unfolded configuration;
   (b) a foldable, generally upstanding retaining wall integrally connected to said floor section having an upstanding configuration for containing the spilled material in cooperation with said floor section in said unfolded configuration;
   (c) a plurality of foldable side braces connected to said wall sheeting having a bracing position for maintaining said wall in said upstanding configuration;
   (d) said side braces including:
      (i) a generally vertical rigid leg carried by said retaining wall,
      (ii) a generally horizontal leg generally parallel to said ground sheeting in said bracing position,
      (iii) an inclined rigid leg extending between an upper portion of said retaining wall and said horizontal leg in said bracing position for bracing said retaining wall in said upstanding configuration,
      (iv) a hinge defined at an intersection of said inclined leg and said horizontal leg about which said inclined leg and said horizontal leg pivot relative to each other, and
   (e) a brace fixture affixing said hinge at a fixed distance from said retaining wall when side brace is in said bracing position and said retaining wall is in said upstanding position for retaining said spilled material.

2. The apparatus of claim 1 wherein said inclined leg is disposed on an exterior side of said retaining wall, and said brace fixture includes an anchor carried near said exterior side of said retaining wall securing said interior leg in an exterior bracing position.

3. The apparatus of claim 2 wherein said anchor includes an anchor tab connected to said floor ground sheeting, and said horizontal leg is secured underneath said anchor tab.

4. The apparatus of claim 2 wherein said brace fixture includes an anchor affixed to said ground sheeting near an interior side of retainer wall for securing said inclined leg in an interior bracing position so that said side braces may be selectively positioned on the interior or exterior side to provide a desired trip profile.

5. The apparatus of claim 1 wherein said brace fixture includes an anchor affixed to said ground sheeting near an interior side of retainer wall securing said horizontal leg in position.

6. The apparatus of claim 5 wherein said anchor includes an anchor tab of ground sheeting, and said horizontal leg fits underneath said anchor tab and extends toward said retaining wall.

7. The apparatus of claim 1 wherein said horizontal leg includes a strap of sheet material which encases a rigid bar.

8. The apparatus of claim 7 wherein said horizontal leg includes a grommet for fastening said horizontal leg to the ground.

9. The apparatus of claim 1 wherein said inclined leg folds generally flat in said folded configuration.

10. The apparatus of claim 1 wherein said brace fixture includes a rigid arm formed as part of said horizontal leg that extends from said hinge generally to said vertical leg, said rigid arm having a free end disposed in an abutting relationship with said vertical leg at said retaining wall.

11. The apparatus of claim 10 including a connector strap connected near said hinge and one of said retaining wall and said ground sheeting for fixing the position of said hinge at said fixed distance from said retaining wall.

12. The apparatus of claim 11 wherein said rigid arm includes a rear arm element extending rearwardly from said hinge by which said horizontal leg may be grasped and pivoted about said hinge to move said rigid arm out of said abutting relationship with said vertical leg for configuring said container in said folded configuration.

13. The apparatus of claim 10 wherein said inclined leg includes a rigid bar extending generally from said upper portion of said retaining wall and terminating in a terminal end near said hinge for bracing said retaining wall in said upstanding configuration; and a strap formed from sheeting encasing said rigid bar of said inclined leg and said rigid arm of said horizontal leg to form said hinge near an intersection thereof.

14. The apparatus of claim 13 wherein said rigid arm of said horizontal leg includes a rear arm element encased within said strap and extending rearwardly from said hinge by which said horizontal leg may be grasped and pivoted about said hinge to move said rigid arm out of said abutting relationship with said retaining wall for configuring said container in said folded configuration.

15. The apparatus of claim 14 including a connector strap connected near said hinge and one of said retaining wall and said ground sheeting for fixing the position of said hinge at said fixed distance.

16. A portable containment for containing spilled material and preventing environmental ground contamination which may be easily folded for transportation and storage, comprising:

(a) a foldable ground sheeting overlying the ground in an unfolded configuration, said ground sheeting having a floor section for containing said spilled material in said unfolded configuration;

(b) a foldable, generally upstanding retaining wall integrally connected to said floor section having an upstanding configuration for containing the spilled material in cooperation with said floor section in said unfolded configuration;

(c) a plurality of foldable, generally rigid braces connected to said wall and said ground sheeting for maintaining said wall in said upstanding configuration;

(d) said side braces including a generally vertical rigid leg carried by said retaining wall, a generally horizontal leg extending generally parallel to said ground sheeting in said bracing position, and an inclined rigid leg extending generally between an upper portion of said retaining wall and said horizonal leg for maintaining said retaining wall in said upstanding configuration in said bracing position, and said inclined leg having a terminal end terminating at said horizontal leg; and (e) a brace fixture affixing said terminal end of said inclined brace leg at a fixed distance from said retaining wall and said vertical leg when said retaining wall is in said upstanding position for retaining said spilled material.

17. The apparatus of claim 16 wherein said brace fixture includes a first anchor carried on an exterior side of said retaining wall and a second anchor carried on an interior side of said retaining wall; and said side brace is anchored in said bracing position by said first anchor when said inclined leg is disposed on said exterior side and is anchored by said second anchor when said inclined brace is disposed on said interior side.

18. The apparatus of claim 17 wherein said first anchor includes an anchor tab, and said horizontal leg fits underneath said anchor tab.

19. The apparatus of claim 17 wherein said second anchor is affixed to said ground sheeting near said interior side of retainer wall engaging said horizontal leg.

20. The apparatus of claim 19 wherein said second anchor includes an anchor tab, and said horizontal leg fits underneath said anchor tab and extends toward said retaining wall.

21. The apparatus of claim 1 wherein said brace fixture includes a rigid arm formed as part of said horizontal leg that extends generally from said hinge to said retaining wall, said rigid arm having a free end disposed in an abutting relationship with vertical leg at said retaining wall; and a connector strap connected near said hinge and one of said retaining wall and said ground sheeting for fixing the position of said hinge at said fixed distance.

22. The apparatus of claim 21 wherein said rigid arm of said horizontal leg includes a rear arm element extending rearwardly from said hinge by which said horizontal leg may be rotated about a hinge to move said rigid arm out of said abutting relationship with said retaining wall for configuring said container in said folded configuration.

23. A portable containment for containing spilled material and preventing environmental ground contamination which may be easily folded for transportation and storage, comprising:

(a) a foldable ground sheeting overlying the ground in an unfolded configuration, said ground sheeting having a floor section for containing said spilled material in said unfolded configuration;

(b) a foldable, generally upstanding retaining wall integrally connected to said floor section having an upstanding configuration for containing the spilled material in cooperation with said floor section in said unfolded configuration;

(c) a plurality of foldable, generally rigid side braces having a bracing position for maintaining said retaining wall in said upstanding configuration when said ground sheetin is in said unfolded configuration;

(d) said side braces including an inclined rigid leg extending between an upper portion of said retaining wall and said ground in said bracing position;

(e) said side braces having an exterior bracing position in which said inclined leg is disposed on an exterior side of said retaining wall and an interior bracing position in which said inclined leg is disposed on an interior side of said retaining wall; and (f) a first brace fixture carried on an exterior side of said retaining wall for affixing said inclined leg in said exterior bracing position, and a second brace fixture carried on an interior side of retaining wall for affixing said inclined leg in said interior bracing position so that said side braces may be selectively positioned on the interior or exterior of said retaining wall to provide a desired trip profile.

24. The apparatus of claim 23 wherein said side braces include a a generally vertical rigid leg carried by said retaining wall; and a generally horizontal leg which is joined and intersected by said inclined leg.

25. The apparatus of claim 24 wherein said first brace fixture includes an exterior anchor tab, and said horizontal leg fits underneath said anchor tab.

26. The apparatus of claim 25 wherein said second brace fixture includes an interior anchor tab, and said horizontal leg fits underneath said anchor tab and extends toward said retaining wall.

27. The apparatus of claim 24 wherein said vertical leg and inclined leg include rigid bars encased in a strap of sheeting material.

* * * * *